United States Patent
Ciardullo et al.

(10) Patent No.: US 6,229,572 B1
(45) Date of Patent: May 8, 2001

(54) METHOD FOR TRANSMITTING DATA ON VIEWABLE PORTION OF A VIDEO SIGNAL

(75) Inventors: Daniel Andrew Ciardullo; Kurt Louis Kosbar; Christopher Eric Chupp, all of Rolla, MO (US)

(73) Assignee: Koplar Interactive International, LLC, St. Louis, MO (US)

( * ) Notice: Subject to any disclaimer, the term of this patent is extended or adjusted under 35 U.S.C. 154(b) by 0 days.

(21) Appl. No.: 09/535,401

(22) Filed: Mar. 27, 2000

Related U.S. Application Data

(63) Continuation of application No. 09/046,413, filed on Mar. 23, 1998, now Pat. No. 6,094,228.
(60) Provisional application No. 60/063,417, filed on Oct. 28, 1997.

(51) Int. Cl.[7] ....................................... H04N 7/08
(52) U.S. Cl. .......................................... 348/473; 348/553
(58) Field of Search .................................. 343/473, 476, 343/469, 553, 564, 478

(56) References Cited

U.S. PATENT DOCUMENTS

| | | | |
|---|---|---|---|
| 3,493,674 | * | 2/1970 | Houghton . |
| 3,728,480 | * | 4/1973 | Baer . |
| 3,737,566 | * | 6/1973 | Baer et al. . |
| 3,777,410 | * | 12/1973 | Robinson . |
| 3,842,196 | * | 10/1974 | Loughlin ............................ 348/473 |
| 3,900,887 | * | 8/1975 | Soga et al. . |
| 3,984,624 | * | 10/1976 | Waggener ........................... 348/473 |
| 3,993,861 | * | 11/1976 | Baer . |
| 4,186,413 | * | 1/1980 | Mortimer . |
| 4,206,557 | * | 6/1980 | Swinton . |
| 4,218,697 | * | 8/1980 | Leventer . |
| 4,329,684 | * | 5/1982 | Monteath et al. . |
| 4,368,456 | * | 1/1983 | Degoulet et al. .................... 348/598 |
| 4,599,644 | * | 7/1986 | Fischer . |
| 4,608,601 | * | 8/1986 | Shreck et al. . |
| 4,729,563 | * | 3/1988 | Yokoi . |
| 4,807,031 | * | 2/1989 | Broughton et al. . |
| 4,969,041 | * | 11/1990 | O'Grady et al. ..................... 348/473 |
| 5,200,822 | * | 4/1993 | Bronfin et al. ...................... 348/473 |
| 5,243,423 | * | 9/1993 | DeJean et al. ...................... 348/473 |
| 5,327,237 | * | 7/1994 | Gerdes et al. . |
| 5,387,941 | * | 2/1995 | Montgomery . |
| 5,404,160 | * | 4/1995 | Schober et al. . |
| 5,557,333 | * | 9/1996 | Jungo et al. . |
| 5,557,334 | * | 9/1996 | Legate . |
| 5,559,559 | * | 9/1996 | Jungo et al. . |
| 5,663,766 | * | 9/1997 | Sizer, II . |
| 5,666,168 | * | 9/1997 | Montgomery . |
| 5,767,896 | * | 9/1998 | Nemirofsky . |

OTHER PUBLICATIONS

"A Novel TV Add–On Data Communication System" Patrick J. King, Hazeltine Research, Inc. Chicago, ILL 60639.*

* cited by examiner

Primary Examiner—Victor R. Kostak
(74) Attorney, Agent, or Firm—Gottlieb, Rackman & Reisman, P.C.

(57) ABSTRACT

A method of encoding data in the visible portion of a transmitted video signal without degrading display of the received video signal, and for decoding the data in the received video signal. Each group of data bits to be transmitted, referred to a data symbol, is associated with one of a number of longer predetermined sequences of chips. Each chip sequence is divided into a multiplicity of lines of chips, and each line of chips together with its inverse are embedded, in pairwise fashion, in respective pairs of line scans of the video signal prior to its transmission. Received pairs of line scans are operated upon to detect the lines of chips they represent, and each of the number of chip sequences is correlated with the detected line of chips to derive a correlation magnitude. The chip sequence with the largest correlation magnitude is selected as the chip sequence whose data symbol was transmitted.

14 Claims, 13 Drawing Sheets

BITS TO ENCODE: 0101
PN SEQUENCE: 1011010011101011

FIG. 8

CORRELATION USING RESULTS OF FIGURE 7

ASSUMPTIONS:
1.) INTEGRATOR GAIN IS SET SUCH THAT
    ∫LINE 1 - ∫LINE 2 = +0.1 OR -0.1 VOLTS
2.) TWO 4-CHIP PN SEQUENCES TO CHECK: 1001, 1110

| CHIP # | PN SEQUENCE | ADD OR SUBTRACT | CORRELATION ACCUMULATOR |
|---|---|---|---|
| 1 | 1 | + | 0.1 |
| 2 | 0 | − | 0.2 |
| 3 | 0 | − | 0.3 |
| 4 | 1 | + | 0.4 |
| 1 | 1 | + | 0.1 |
| 2 | 1 | + | 0.0 |
| 3 | 1 | + | −0.1 |
| 4 | 0 | − | −0.2 |

SINCE THE CORRELATION ACCUMULATOR IS LARGER FOR 1001 THAN FOR 1110, THE MOST PROBABLE PATTERN TRANSMITTED IS 1001.

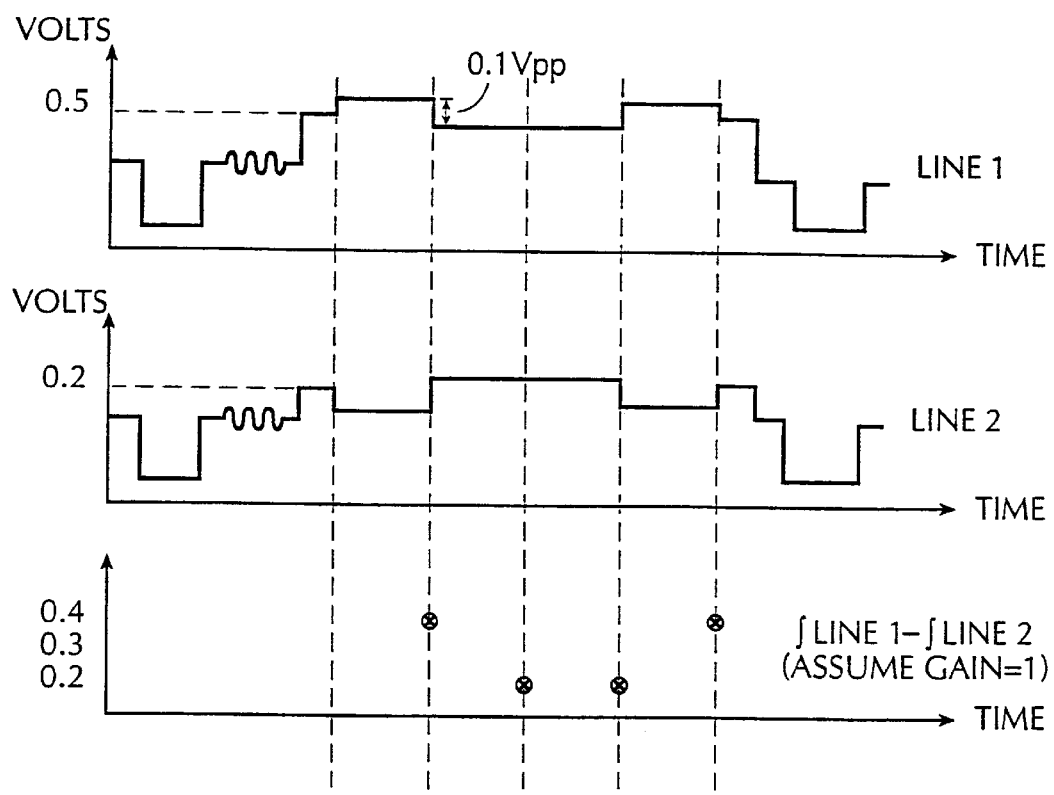

FIG. 10

RULES:
1.) IF THE PRESENT INTEGRATED CHIP VALUE CORRESPONDS TO A CHIP AMPLITUDE THAT IS GREATER THAN ±1.5 TIMES THE PEAK TO PEAK CHIP AMPLITUDE, THEN DO NOT USE IT EXCEPT AS DESCRIBED IN RULE 2.

2.) IF THE PN SEQUENCE BEING CHECKED HAS THE LAST CHIP DIFFERENT FROM THE PRESENT CHIP, THEN SUBTRACT THE LAST CHIP INTEGRATED VALUE FROM THE PRESENT INTEGRATED CHIP VALUE AND USE THE RESULT BY ADDING OR SUBTRACTING FROM THE CORRELATION ACCUMULATOR AS USUAL.

| CHIP # | PN SEQUENCE | ADD OR SUBTRACT | LAST DIFFERENT | OUT OF RANGE | CORRELATION ACCUMULATOR |
|---|---|---|---|---|---|
| 1 | 1 | + | NA | YES | 0.0 |
| 2 | 0 | − | YES | YES | +0.2 |
| 3 | 0 | − | NO | YES | +0.2 |
| 4 | 1 | + | YES | YES | +0.4 |
| 1 | 1 | + | NA | YES | 0.0 |
| 2 | 1 | + | NO | YES | 0.0 |
| 3 | 1 | + | NO | YES | 0.0 |
| 4 | 0 | − | YES | YES | −0.2 |

CONCLUSION:
USING THE ABOVE RULES, THE CORRECT PN CODE IS DETERMINED

| CS | START OF FIRST CHIP RELATIVE TO HORIZONTAL SYNC RISING EDGE | 8μSEC ±0.1 |
|---|---|---|
| CA | PEAK TO PEAK CHIP AMPLITUDE | 5mV to 20mV |
| CW | CHIP WIDTH | 2.3μSEC ±0.5 |
| * | NUMBER OF CHIPS PER HORIZONTAL LINE | 20 |
| * | STARTING HORIZONTAL LINE | 25 |
| * | ENDING HORIZONTAL LINE | 233 |
| * | LINES PER DATA PATTERN | 8 |
| * | DATA PATTERNS POSSIBLE | 8 |
| * | DATA PATTERNS ENCODED ON ONE FIELD | 25 |
| * | RAW DATA BITS PER FIELD | 100 |

METHOD FOR TRANSMITTING DATA ON VIEWABLE PORTION OF A VIDEO SIGNAL

RELATED APPLICATIONS

This is a continuation of application Ser. No. 09/046,413 filed Mar. 23, 1998, now U.S. Pat. No. 6,094,228 and claims priority to provisional application Ser. No. 60/063,417 filed Oct. 28, 1997.

This invention relates to the transmission of data on a video signal and, more particularly, to the transmission of data on the viewable portion of an analog video signal.

BACKGROUND

There have been attempts in the past to superimpose data on a video signal. The most common approach is to insert data during the vertical blanking interval, such as in the generation of closed captioning signals. Another approach has been to place the data on the visible portion of the video signal. One advantage of the latter approach is that it may be possible to detect the data optically as well as electrically.

An example of the optical-detection approach is disclosed in Broughton et al. Pat. No. 4,807,031. The basic technique disclosed in this patent is to represent data by raising and lowering the luminance of successive horizontal lines within some designated viewing area. Because the average luminance of the two adjacent lines remains the same, the effect is not perceptible to the eye, but sensing of the alternate raising and lowering of the luminance by an appropriate receiver allows the data to be detected. As described in the Broughton et al. patent, the technique is equivalent to superimposing on the video signal a subcarrier frequency of 7.867 kHz, which can be detected by appropriate filtering. Broughton et al. also teach how to determine which fields should have data superimposed on them. For example, fields that are too white or too black are not appropriate for the insertion of data.

It is a general object of our invention to insert data on the visible portion of a video signal by changing the luminance of paired lines in opposite directions, but to do so in a manner that allows for a much higher data rate and the detection of the data in a much more accurate manner than has been possible in the prior art.

As used herein, the term video signal applies to any representation of the standard NTSC, PAL or SECAM signals in common use for video transmission including the analog form, directly digitized numerical representations, CCIR 601/656 standards-based digital representations, computer representations such as RGB or YUV, or other digital representations that are simply numerically converted from the directly digitized representation of standard video. (Encoding and decoding from any digitized form is contemplated as long as it can be determined how the signal was digitized and that information is not lost after digitization.)

SUMMARY OF THE INVENTION

Data is transmitted in the form of groups of data bits called symbols. Each symbol has associated with it one of a predetermined number of longer sequences of "chips" called PN sequences. The PN sequence transmitted for any symbol is divided into a multiplicity of lines of chips. Each line of chips is transmitted together with its inverse, in pair-wise fashion, by embedding them in respective pairs of line scans of the video signal. For example, each symbol representing 4 data bits may have associated with it one of 16 PN sequences of 80 chips each. Any such PN sequence that is to be superimposed on the video signal is divided into 4 lines of 20 chips each. Each line of chips is transmitted in its normal form and with its inverse, so that 8 lines of 20 chips each are added to or subtracted from respective line scans of the video signal.

Received pairs of line scans are operated upon to extract the 20 chips that they represent. This is done by subtracting one line scan from the other in order to minimize the effect of the video, and by integrating the difference signal for the duration of each chip. Because each chip in the original PN sequence is added to one line scan and subtracted from the other, when one line scan is subtracted from the other not only is the video effect minimized, but the magnitude of the chip amplitude is doubled. After all 80 chip pairs are processed in this way to derive 80 "integrated chip values," the received code is correlated with each of the 16 possible PN sequences for a best match. The symbol that was transmitted is deemed to be that one whose PN sequence has the highest correlation with the received code.

Further objects, features and advantages of our invention will become apparent upon consideration of the following detailed description in conjunction with the drawing, in which.

Figure 4A:
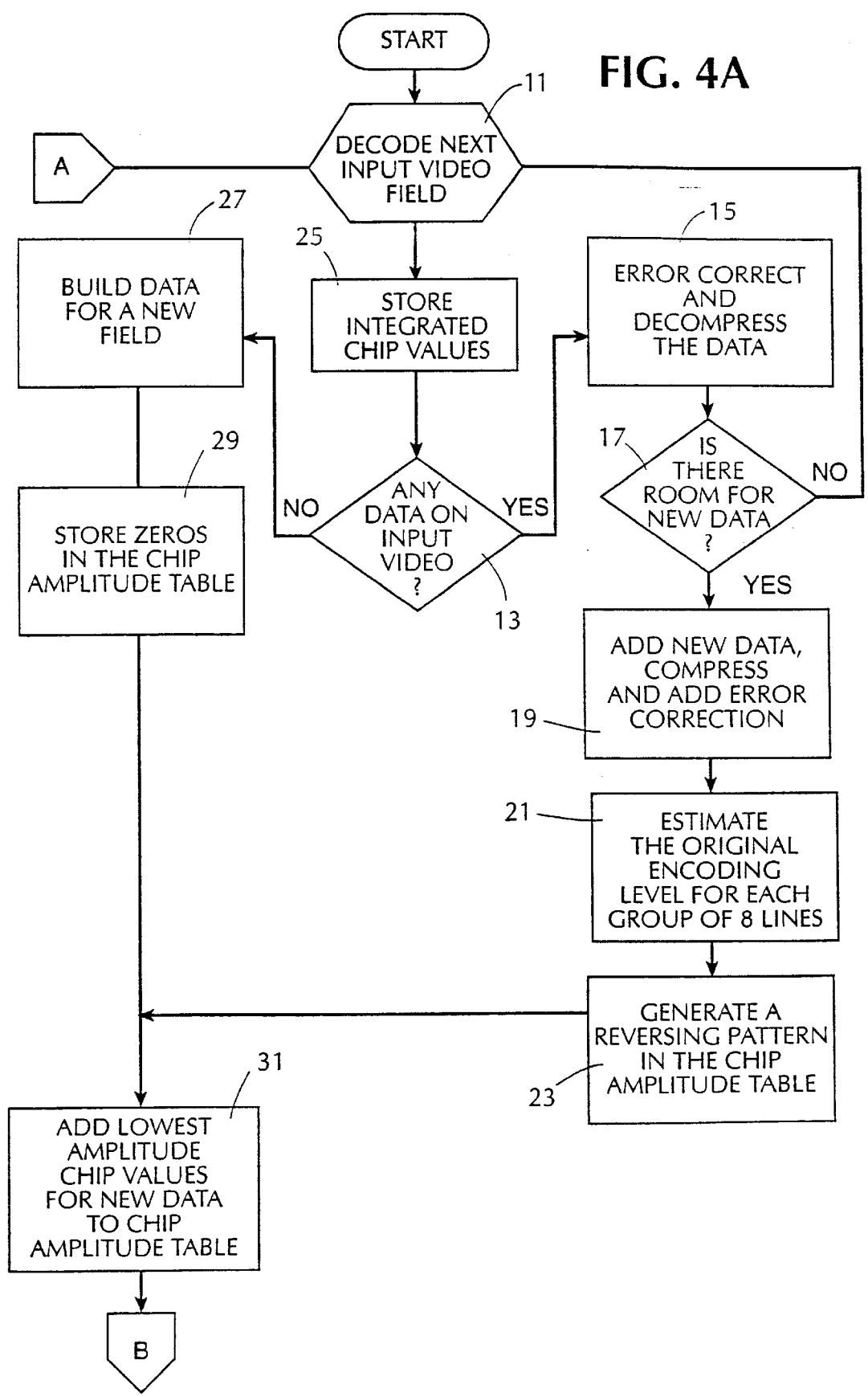
Figure 4B:
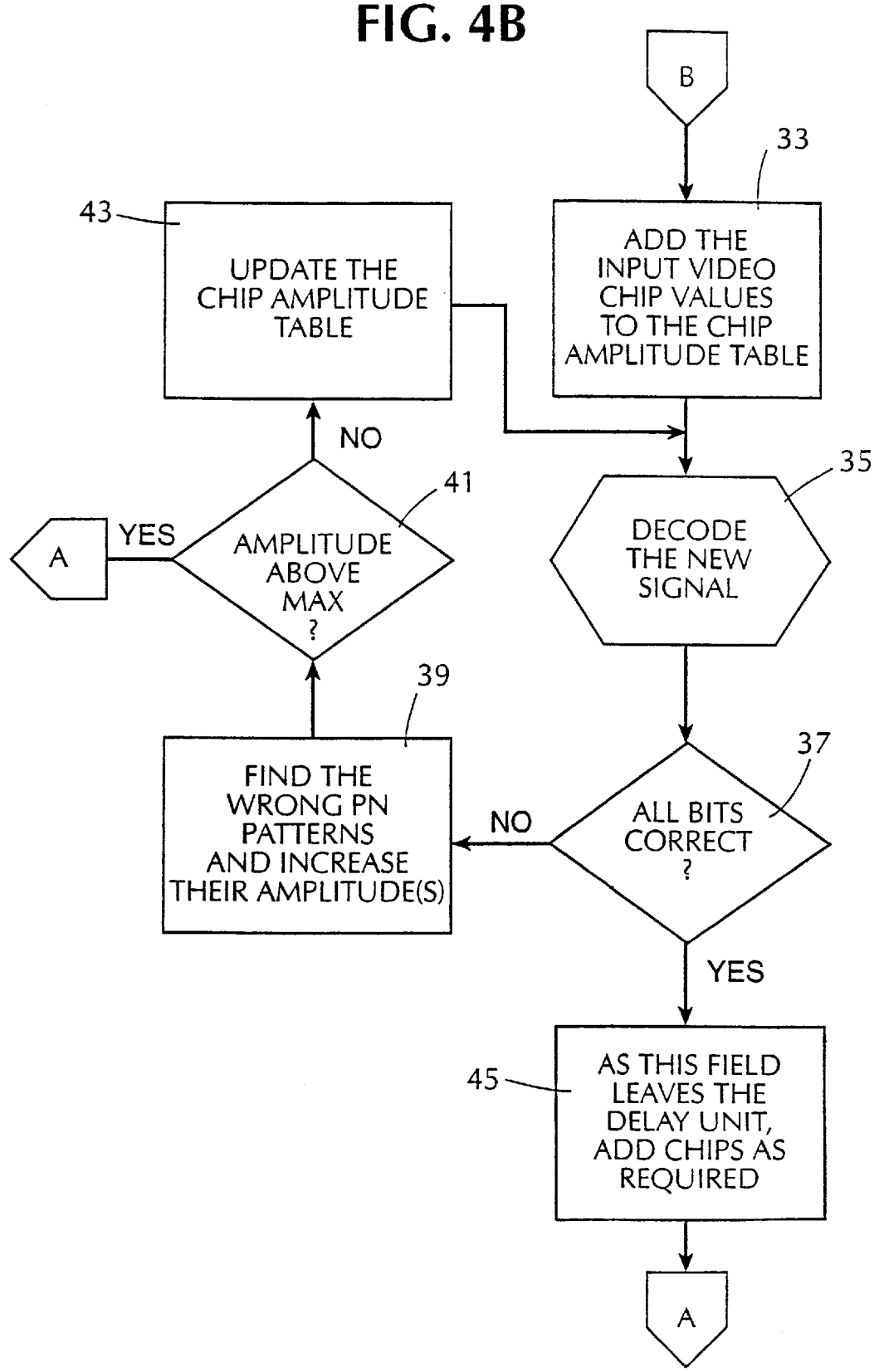
Figure 5:
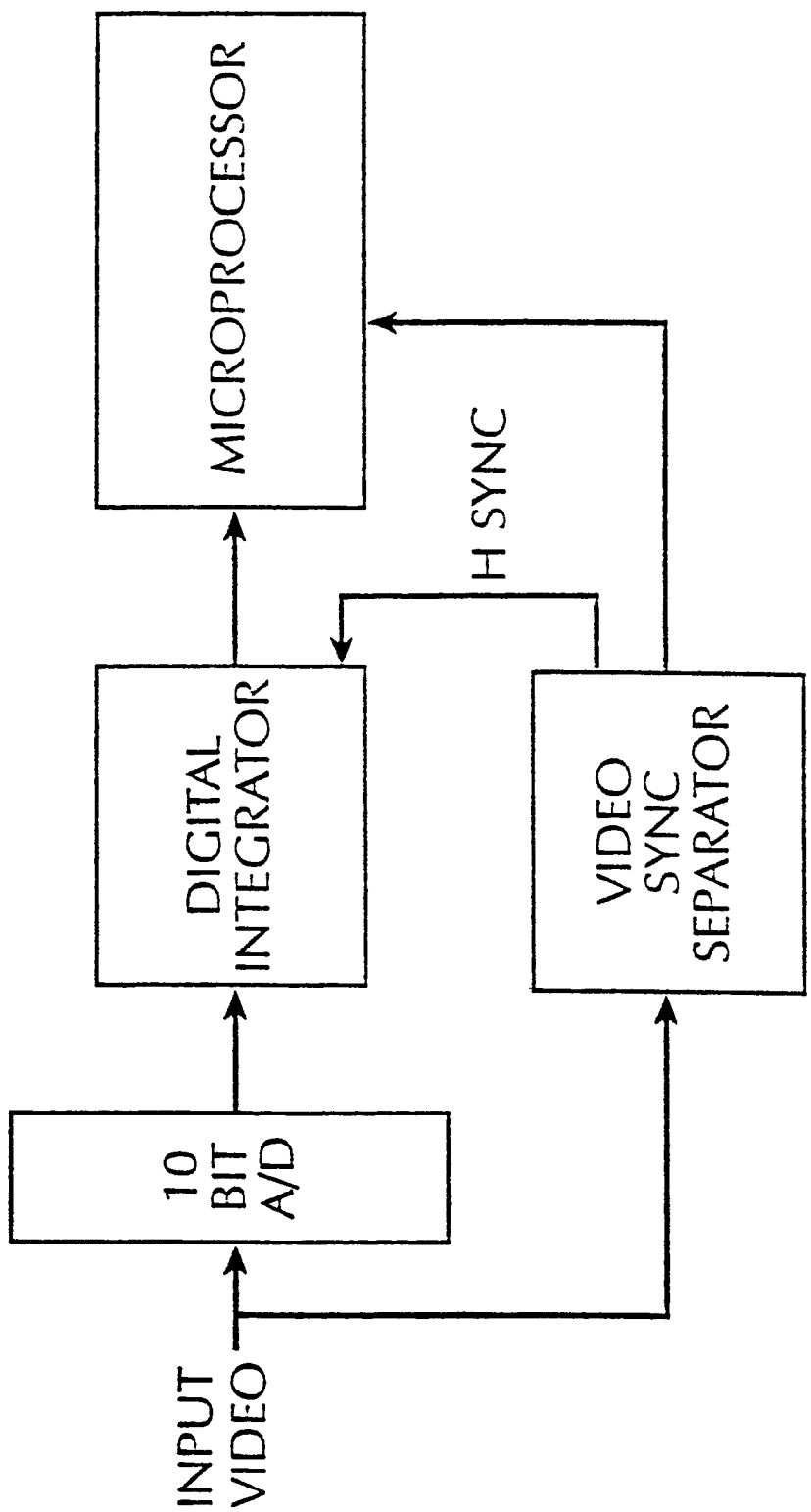
Figure 6A:
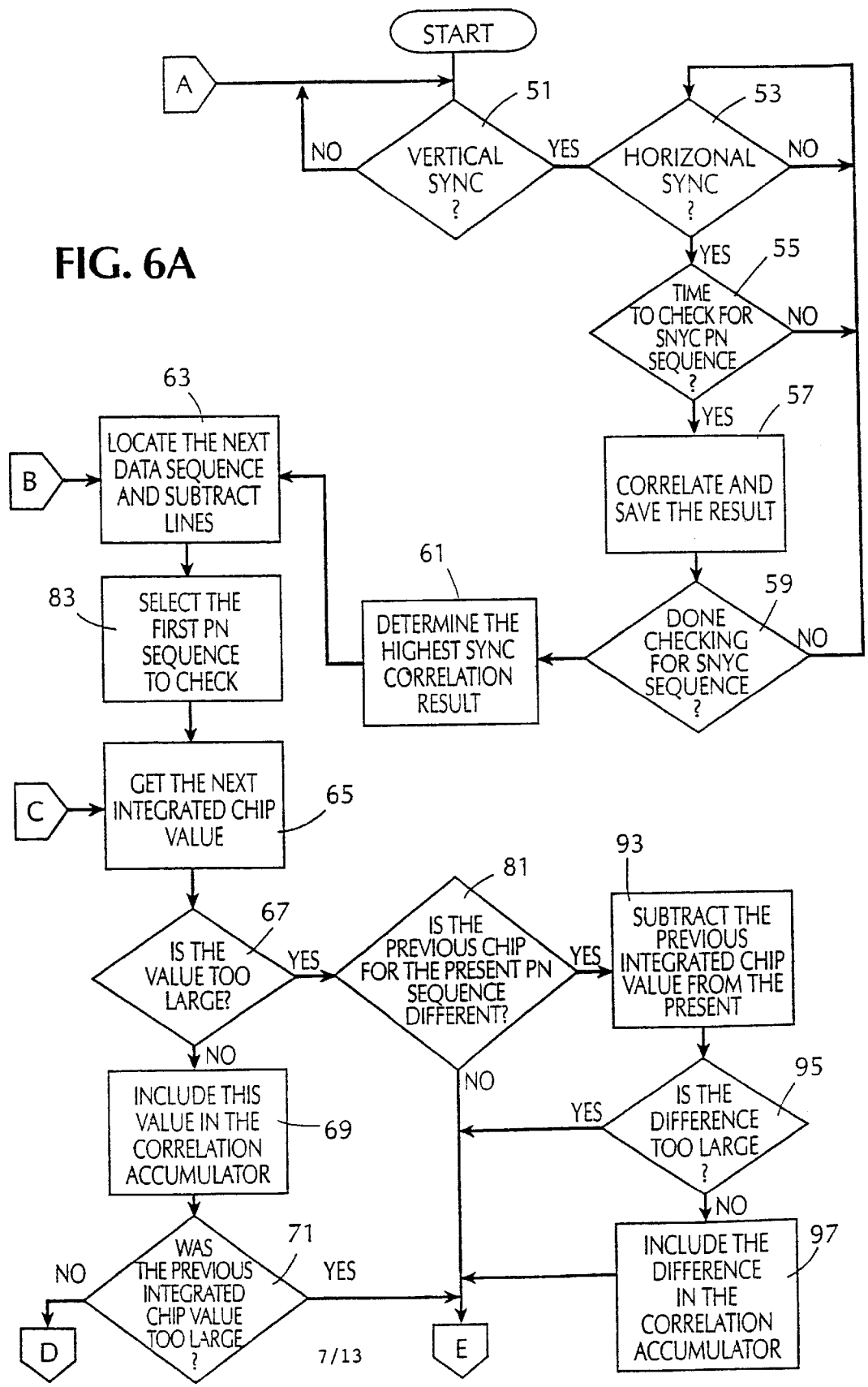
Figure 6B:
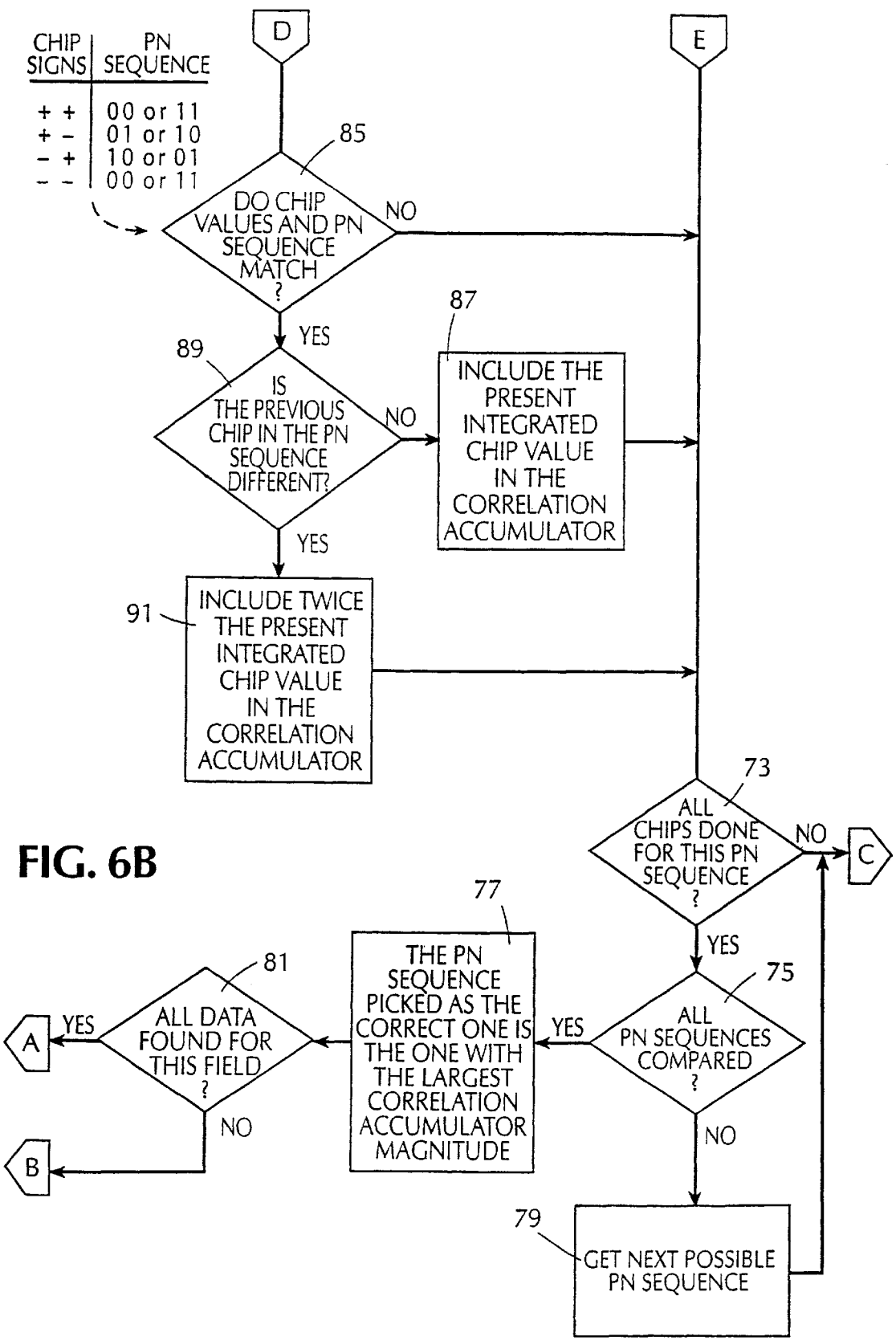
Figure 7:
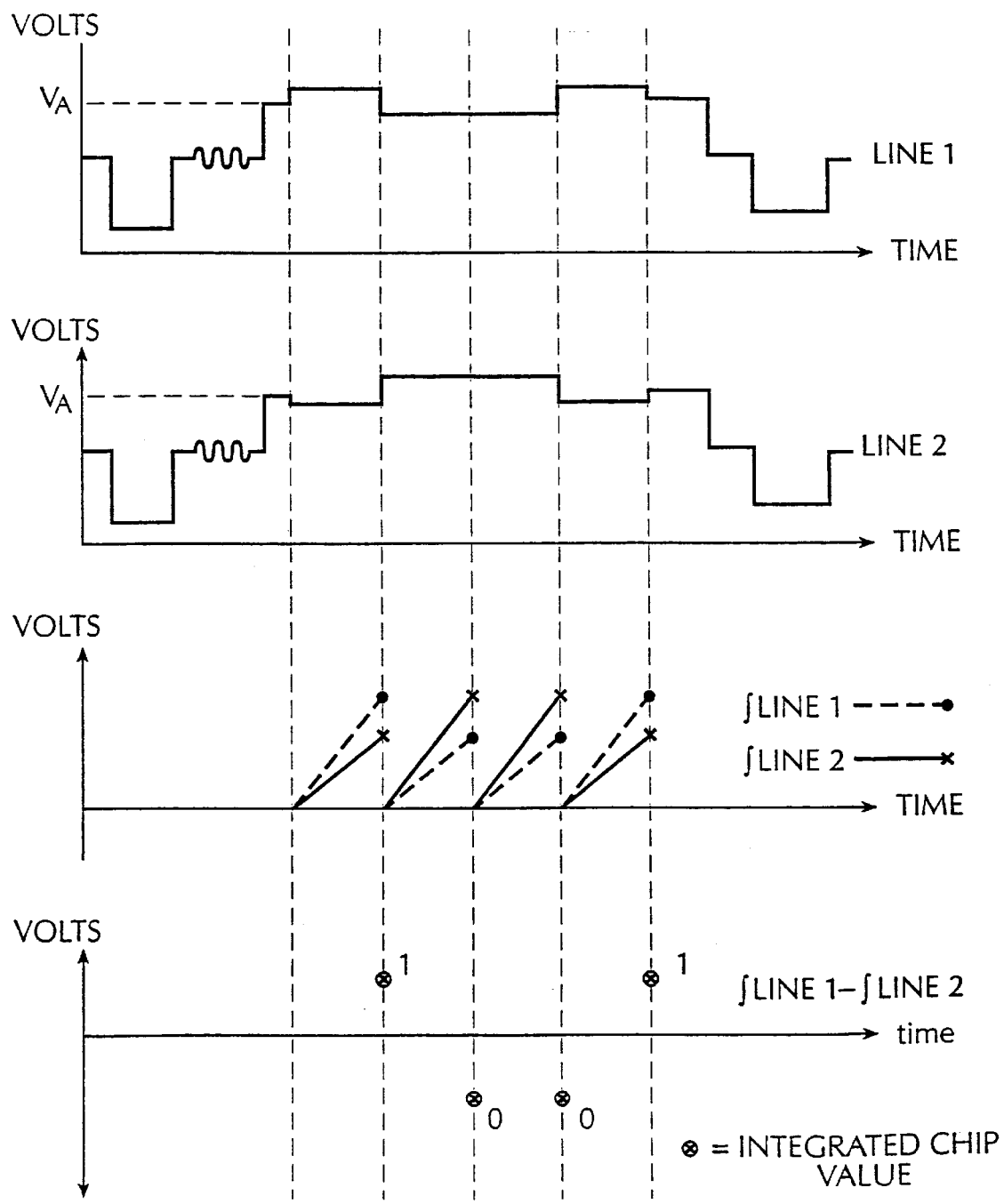
Figure 11:
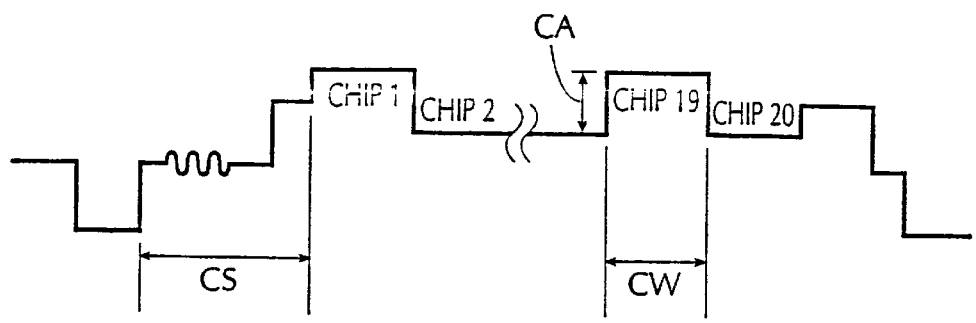

FIGS. 4A and 4B comprise a flow chart illustrating the encoding process;

FIG. 5 depicts an illustrative decoder at a television receiver;

FIGS. 6A and 6B comprise a flow chart illustrating the processing at the receiver;

FIG. 7 illustrates how each "integrated chip value" is derived;

FIG. 8 illustrates the correlation process of the invention;

FIG. 9A illustrates the effect of a line-to-line video bias, and FIG. 9B shows why such a bias can give rise to a decoding error;

FIG. 10 specifies rules to be used for eliminating the error introduced by a line-to-line bias and provides a typical example using such rules; and FIG. 11 illustrates preferred parameter values.

DETAILED DESCRIPTION OF THE INVENTION

As used herein, a PN (pseudo-noise) code is a series of 1s and 0s such that the probability of a 1 or 0 is 50%, and the value of any bit does not depend on the value of the previous bit. A pseudo-noise generator, of which many are known in the art, provides a sequence similar to the heads/tails sequence generated by flipping a coin, but any pattern is repeatable simply by starting the generator in the same state. As used herein, a PN sequence is a specific series of 1s and 0s from all possible PN codes.

The communication method of the invention is to generate a "chip" for each 0 or 1 in a PN sequence. A chip is simply a DC level added to or subtracted from the video signal, and whose duration corresponds to a 1 or a 0 in a PN sequence. A chip is defined as the period of time between possible transition points.

Figure 1:
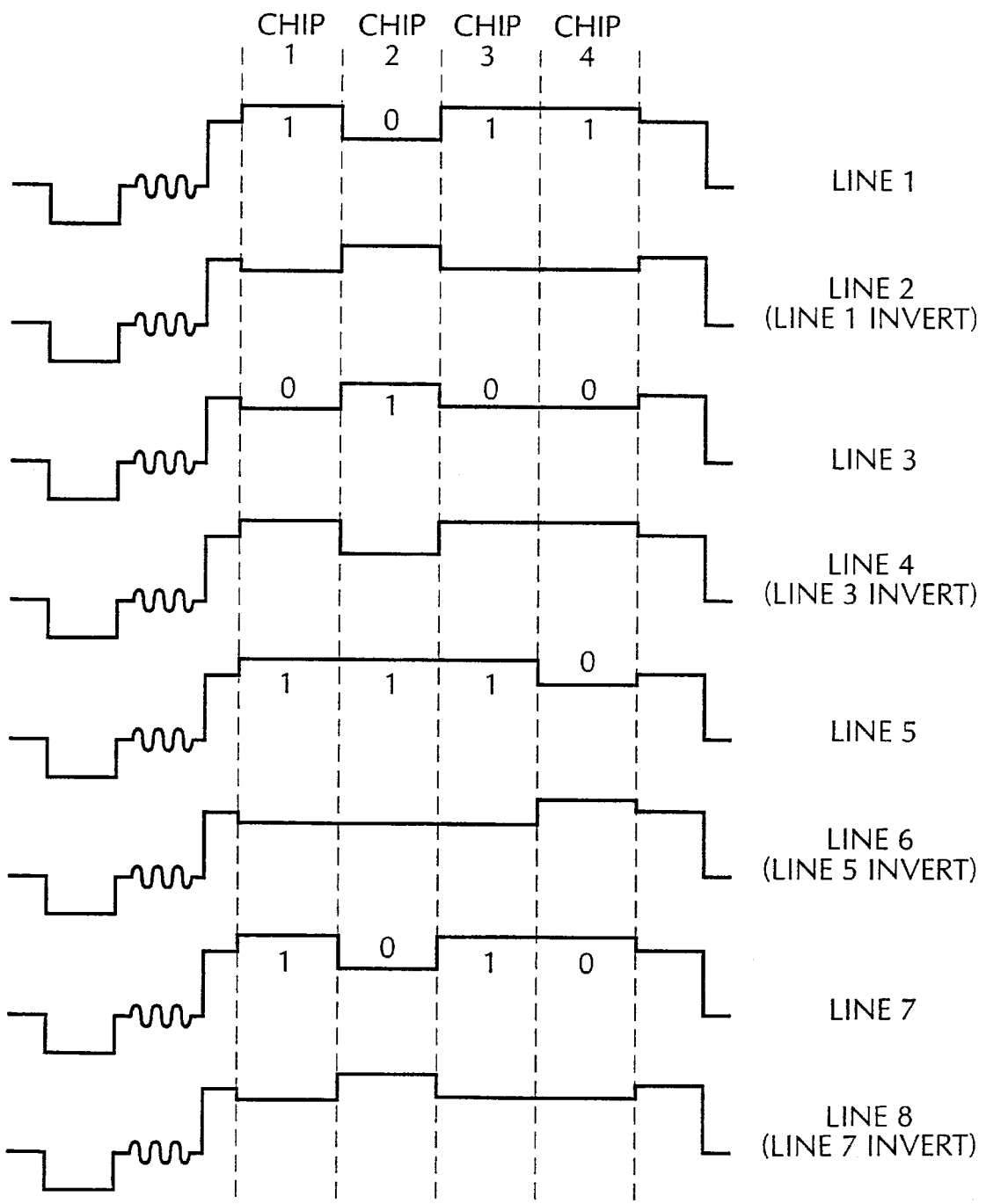
FIG. 1 depicts the manner in which a typical PN sequence associated with a respective symbol is superimposed on line scans of a video signal.

FIG. 1 depicts a 16-chip PN sequence, representing a 4-bit symbol, that is to be encoded. It is not wise to encode data bits directly on a video signal simply by generating four chips and their inverses. It is very difficult to decode an incoming video signal and to extract chip values without errors. Even adding standard error correction codes to a group of bits will generally not allow error-free decoding. For this reason, a statistical approach is taken. Instead of transmitting four bits of information in the form of four chips (eight, with their inverses), many more chips are transmitted. A different 16-chip PN sequence is associated with each four-bit symbol. At the receiver, the received PN code is compared with the 16 PN sequences associated with the 16 symbols, and that one of the 16 PN sequences that is the most highly correlated with the detected code is considered to represent the sequence that was transmitted and from which the original four-bit symbol can be determined.

FIG. 1 depicts the manner in which the four-bit symbol 0101 is represented by chips in the video signal. There is a 16-chip PN sequence uniquely associated with this four-bit symbol. The 16-chip sequence is divided into four sub-groups. Each sub-group is transmitted twice, on two paired lines (although the lines and sub-groups need not be successive), with the second line being the inverse of the first. Thus, the first four chips shown in FIG. 1 for the specified PN sequence are 1011. Line 1 of the video used to encode the PN sequence represents these four chips, where a 1 is represented by a small positive voltage added to the video signal, and a 0 is represented by a small negative voltage added to the video signal. (Throughout FIG. 1, for the sake of clarity, the video signal is shown as a constant gray level, i.e., a constant amplitude.) The second line is the inverse of the first, with a chip of value 1 giving rise to a small negative voltage added to the video signal, and a chip of value 0 giving rise to a small positive voltage added to the video signal. The next four chips in the PN sequence under consideration, 0100, are represented on lines 3 and 4 in the same manner. It thus takes 8 lines to represent 16-chips, which in turn are associated with a four-bit symbol (the ultimate information to be transmitted).

Throughout this description, it is assumed that each four-bit symbol has one of 16 unique 16-chip PN sequences associated with it. In actual practice, 20 chips per line are preferred. Thus, 80-chip PN sequences are used, and eight lines give rise to 80 chips and their inverses to represent four bits. This provides much greater accuracy in detection. The four-chip per line example is used throughout this description only for the sake of simplicity. The principles of the invention are easily extended to PN sequences of any length, and to symbols that represent any number of data bits.

The use of multiple chips per line, especially as many as 20 as in the preferred embodiment of the invention, results in a signal spectrum that is spread over a wide frequency range. The result is a form of spread-spectrum communications. This communications technique was originally invented for military use. The idea was to spread the transmitted signal spectrum over a wide frequency range so that any narrow range would have only a small amount of signal energy in it. This allows the signal to be hidden from scanners that look over small frequency ranges, and it also causes the signal to be reasonably protected from single-frequency jammers. Because of the low energy in any one frequency, the data signal has low visibility when it and the video are displayed together on a TV monitor, which is why the technique is advantageous for use in the invention.

Figure 2:
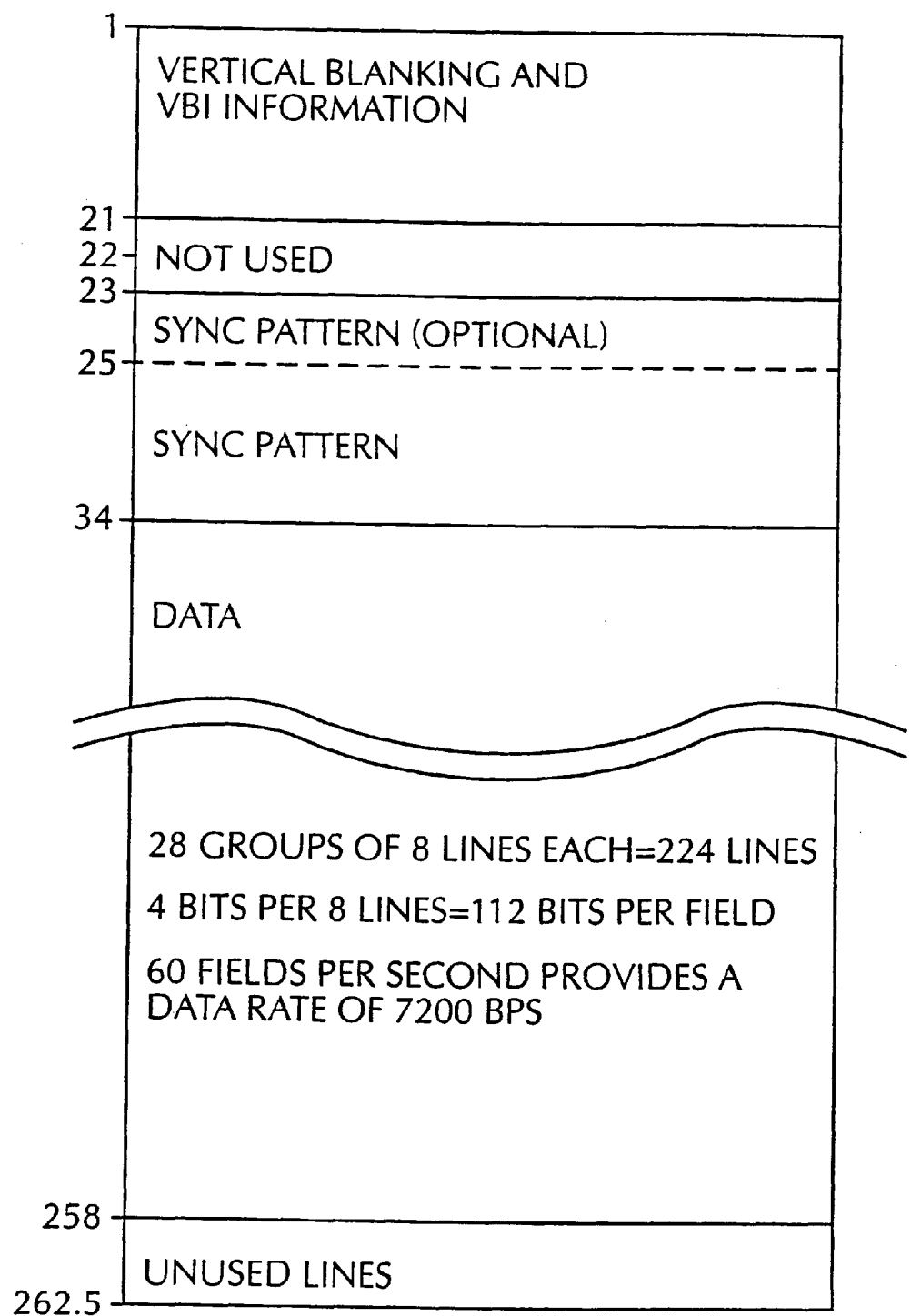
FIG. 2 depicts where in each video field data is transmitted.

FIG. 2 shows the placement of chips within a field of the video signal. Lines 1–21 constitute the vertical blanking interval and any VBI information (such as closed captioning) placed on these lines as is known in the art. In the preferred embodiment of the invention, a sync pattern of chips is transmitted. Once the sync pattern is detected, the decoder at any receiver can operate synchronously since it is known where the lines of chips follow the sync pattern. The sync pattern itself can be one of the 16 PN sequences or it can be a different sequence. Even if it is one of the 16 sequences associated with the 16 symbols that may be transmitted, every receiver knows that the first PN sequence detected in a field is the sync pattern, and not a chip sequence associated with a symbol. The sync pattern is detected in the same way that other chip sequences are detected, as will be described below.

In the preferred embodiment of the invention the sync pattern begins in line 25. However, in the received signal it may start as early as on line 23 or as late as on line 27. The reason for this is that processing of the video signal after the encoder may give rise to the first line being moved up or down one or two lines, as a result of stripping out and then reinserting the horizontal and vertical sync pulses. Because of this, the decoder must start looking for the sync PN sequence a little early and continue looking a little late. The sync pattern comprises eight lines. The sync pattern is encoded on lines 25–32. The first line that the receiver looks at for the beginning of the sync pattern is line 23, and the last is line 34.

The data immediately follows the sync pattern. Eight lines of chips are used for each symbol that is transmitted. Thus, if the data begins in line 35, the last line that can be used is line 258. There are thus 224 chip lines, which allow 28 groups of 8 lines each. Each 8 lines of chips represent 4 bits (each symbol in the illustrative embodiment of the invention represents 4 bits), and, thus, there are (28)(4) data bits represented per field. At a 60-field per second rate, the data rate is 7200 bits per second.

It should be noted that standard error correction techniques can be used, and this will reduce the bit rate. However, error correction per se does not form a part of the present invention. Also, it is expected that data rates can be increased by utilizing standard forms of data compression. All in all, it is estimated that the bit rate in a typical application will be slightly less than 7200 bits per second.

Before proceeding with a description of the encoding hardware and process, it will be helpful to understand the decoding process of FIG. 7 because decoding steps actually take place during encoding. The first two graphs in FIG. 7 depict two successive lines of video for a chip pattern of 1001. In the first line, a small voltage is added for each chip of value 1 and a small voltage is subtracted for each chip of value 0. The addition and subtraction operations are reversed for the paired second line.

The third graph in FIG. 7 shows the result of integrating each line for the duration of each chip. The solid lines represent integrals of line 2 for each chip duration, and the dashed lines similarly represent integrals of chips in line 1. The values represented by circles are the final integrated results over the course of chips in line 1, reflecting both the integral of the video signal itself and the superimposed chip value. Each value represented by the symbol x is the integral over the course of a chip in line 2.

The last graph on FIG. 7 represents what is termed herein "integrated chip values." An integrated chip value is simply the difference between the integral over the course of a chip in line 1, and the integral over the course of the corresponding chip in line 2. In FIG. 7, the integral for the first chip in line 1 is greater than that for the corresponding inverse first chip in line 2, and thus the integrated chip value for this pair of chips is positive, represented by a 1 in the bottom graph. On the other hand, the integral for the second chip is greater for line 2 than for line 1, and thus the integrated chip value is negative, represented by a 0 in the bottom graph. Similar remarks apply to the third and fourth integrated chip values.

While the video signals in the first two graphs are shown as being flat over all chips, in reality the video signal is constantly changing. The integrals taken along the chips are thus multi-valued, as are the integrated chip values. It must be appreciated that the integrated chip values may not really reflect which chips are positive and which are negative (or, more accurately, which chips are transmitted positive in one line and negative in the next, and which are transmitted negative first and then positive). If the video signal changes appreciably from one line to the next, then a resulting integrated chip value will be controlled by the video, and not by which of the opposite polarity chips was transmitted first.

The correlation process is shown in FIG. 8. In practice, each of the 16 PN chip sequences is correlated with the 16 integrated chip values representing the transmitted PN code. Whichever has the highest correlation value is the "winner" and the PN code received is assumed to represent the associated four-bit symbol.

The first assumption in FIG. 8 is that the integrator gain and chip durations are such that each integrated chip value is +0.1 or −0.1 volts. In actual practice, the integrated chip values are multi-valued, and the example of FIG. 8 corresponds to the simplistic two-value example of FIG. 7. In the example used throughout this description the correlation process involves 16-chip sequences (corresponding to 4 line pairs of 4 integrated chip values each). It is also assumed that the integrated chip values 1, 0, 0 and 1 of FIG. 7 are to be checked against only two possibilities, 1 0 0 1 (the correct pattern) and 1 1 1 0.

The correlation process is as follows. The computed integrated chip values for the received PN code are correlated with all possible PN sequences. An accumulator may be provided for each possible PN sequence (only 2 such accumulators being necessary for the example of FIGS. 7 and 8). Each integrated chip value is processed in accordance with the value of the chip in the corresponding position of each possible PN sequence. For any chip of a PN sequence that is a 1, the computed integrated chip value corresponding to that position is added to the correlation accumulator for that PN sequence. If the chip is a 0, the integrated chip value is subtracted from the correlation accumulator. As shown in FIG. 8, for the PN sequence 1001, we have the operations of addition, subtraction, subtraction and addition in sequence. Since from FIG. 7 we see that the first and fourth integrated chip values are positive, and the second and third are negative, and subtracting a negative number produces a positive result, all four integrated chip values, each having an absolute magnitude of 0.1 volt, result in increases in the value in the correlation accumulator, for a total of 0.4. (In general, while each increase or decrease in a correlation accumulator value in FIG. 8 is 0.1 volt, that is because in the simplistic example illustrated all integrated chip values have the same absolute magnitude. In actual practice, the integrated chip values are multi-valued.)

For the PN sequence 1110, on the other hand, we have the operations of addition, addition, addition and subtraction. The last three operations, adding the negative second and third integrated chip values of FIG. 7, and subtracting the fourth positive integrated chip value of FIG. 7, cause the original +0.1 accumulator value after the first integrated chip value is added to the accumulator to be decreased three times in succession, for a final result of −0.2. Thus, the first PN sequence 1001 has the highest correlation value, and it is assumed that the received PN code is the PN sequence 1001.

In the subject invention, successive lines of a pair are encoded using opposite polarity potentials as in the above-identified U.S. Pat. No. 4,807,031. As illustrated in FIG. 7, the basic idea is that by subtracting one line from the other, all that remains is the data signal—provided that the video is eliminated by subtracting one line scan from another. Of course, successive line scans are generally not identical, and that is why integrated chip values often have values that do not accurately reflect the chip polarity. It is the statistical technique represented by FIG. 8 that allows highly accurate identification of the original symbols that were encoded. The major difference between the subject invention and that of the above-identified U.S. Pat. No. 4,807,031 is that instead of a single result per field, or a single result for at least a group of line scans, a much higher data rate is possible because there are many more chips than scan lines. (In fact, even individual chip amplitudes in the same line need not necessarily be the same, as will be described below.) And the decoding process, involving a correlation technique, is totally different from that used in the prior art.

Since each data symbol has 4 bits, it might be thought that 16 PN sequences are required to represent them. In fact, this is the way the invention has been described thus far. With a different PN sequence for each symbol, 16 correlations must be calculated for each computed integrated chip value sequence. However, there is a way to halve the amount of calculation required, and this is done in the illustrative embodiment of the invention as follows.

Only 8 PN sequences are used to represent the 16 symbols. In the invention, each line of chip values is accompanied by a line with inverse chip values. This technique is at the heart of the invention because it is by having complementary lines of chips that it is hoped to cancel out the video signal from the integrated chip values. Since each chip is transmitted in both its normal and inverse forms, it is apparent that transmitting the inverse form first really represents something different. In fact, each integrated chip value for the two lines of FIG. 7 may have its magnitude reversed in sign if the second line is transmitted first. (This is not necessarily true, however, because the video on the two lines may be totally different.) What this means is that only 8 PN sequences are required to represent 16 symbols, but each PN sequence can represent either of 2 symbols depending on whether the normal or inverse form is encoded first. In the correlation process, the "winner" is that one of the 16 symbols whose corresponding PN sequence (taking into account whether the normal or inverse form is transmitted first) has the highest absolute magnitude correlation value. In this case, −2000 is the "winner" over +150. In this way, only 8 correlations must be calculated for each received PN code, rather than 16.

Figure 3:
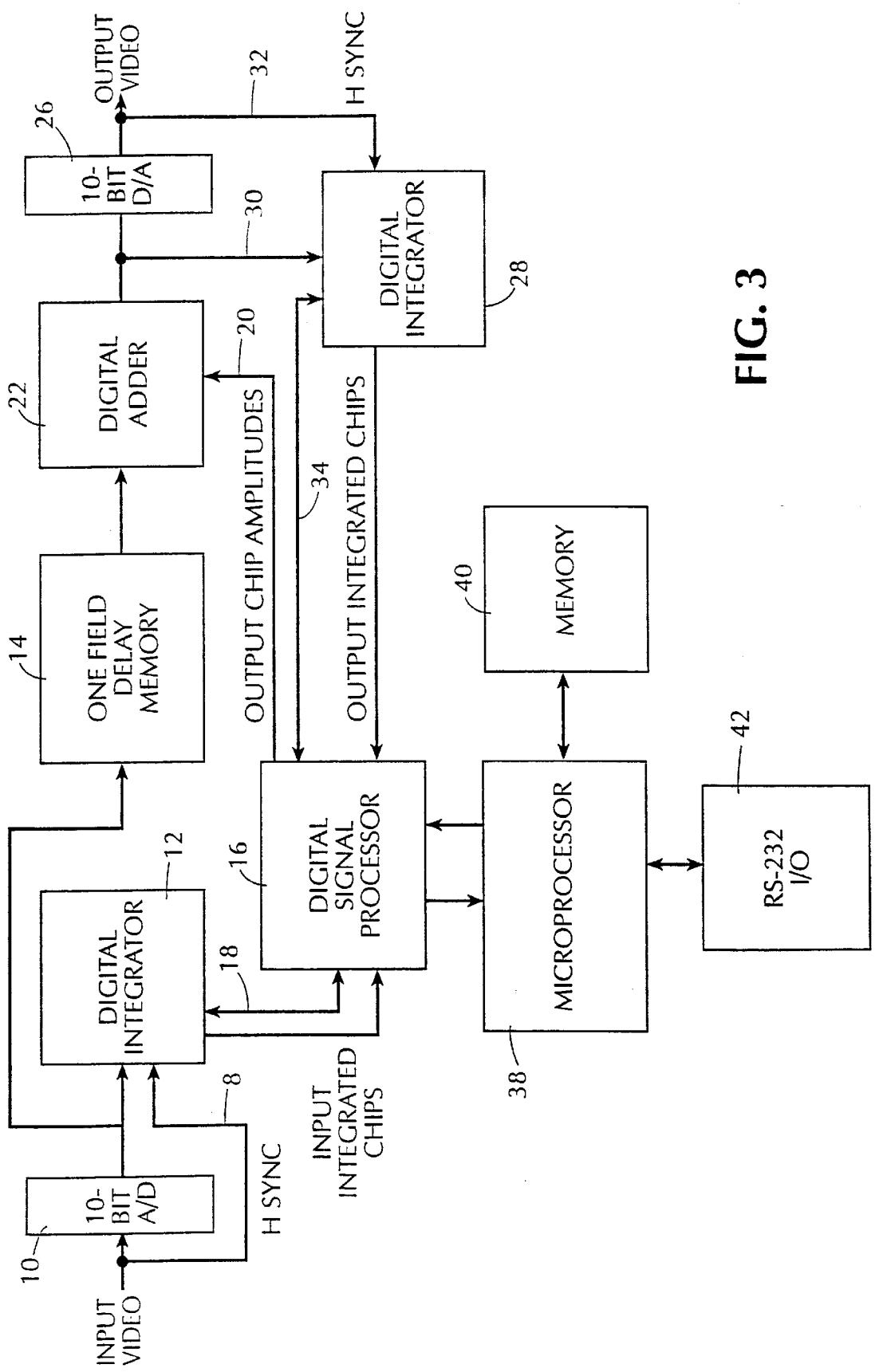
FIG. 3 depicts an illustrative encoder at the video signal broadcast site.

The encoding hardware is shown in FIG. 3. The input video is applied to 10-bit analog-to-digital converter 10, and the output of the converter is applied to both digital integrator 12 and one-field delay memory 14. All processing is performed in the digital domain in the preferred embodiment of the invention, although it need not be. The horizontal sync signal on line 8 synchronizes the digital integrator to each line scan to facilitate the extraction of chip values.

The integrator processes the received video signal and applies the integrated chip values to the input of digital signal processor 16. Because horizontal sync pulses are applied to the digital integrator over line 16, and the digital integrator and the digital signal processor communicate control information over line 18, the digital signal processor is able to start looking for the sync pattern in line 23. The manner in which it detects the sync pattern will be described below. (Although not shown, vertical sync pulses can also be used advantageously to synchronize the digital integrator, as will be apparent to those skilled in the art.)

It is assumed that the incoming video signal may actually have data already superimposed on it. The encoder may be called upon to add to the original data. For example, a broadcast may include data that relates to a pizza advertisement for a national chain. At individual TV stations, it may be necessary to add "local" data to the video signal, for example, data relating to how a consumer may order a pizza for local delivery. That is why the encoder must actually detect data that may be present on the incoming video signal. What is done is to effectively strip this data out of the video signal, to combine it with the new data, and then to encode this composite data all over again on the "clean" video signal, as will be described below in connection with the flow chart that depicts the processing. Actually, the chip components in the incoming video signal are not first physically removed from the video. Rather, these components are stored by the digital signal processor (as determined by the integrated chip values) and are then subtracted from the video signal when the new data is added to it before the video signal is broadcast.

The output chip amplitudes are extended over line 20 to digital adder 22. The digital signal processor determines the chip values required for an entire field. Since delay 14 introduces a delay equal to an entire field, the digital signal processor can apply the new chip amplitudes to the field at the start of the field as it enters the digital adder.

As discussed above in connection with the decoding process, subtracting the integral along one chip from the integral along the paired chip gives an integrated chip value result that ideally is not influenced by the video signal itself, and represents the amplitude of the chip (or, more accurately, twice the amplitude of each chip in the pair as a result of the subtraction of the negative value). It is the integrated chip value that is used to strip off the original chips from the incoming video (by assuming that the video subtraction process is perfect, and calculating the chip magnitude from half the integrated chip value) at the same time that new chips are added. The encoder, as will be described, applies chips of varying amplitudes, depending on the nature of the video signal. The advantage of knowing the original integrated chip values is that it can be presumed that they were correctly determined for the video field being processed by the encoder that placed them on the video signal in the first place, and the same amplitudes can be initially selected for the same chip positions in the video signal now to be encoded.

The output digital field data is applied to the input of 10-bit digital-to-analog converter 26, which forms an analog output video. As a last-ditch check that the data has been placed correctly on the video signal, the output video signal (represented at the output of digital adder 22) is processed by digital integrator 28, the digital output being extended to the integrator over line 30. Horizontal sync pulses in the analog output are applied to an input of the digital integrator over line 32. Control line 34 allows digital signal processor 16 to control digital integrator 28 in the same way that the digital signal processor controls digital integrator 12. Digital integrator 28 generates integrated chip values that are applied to the input of the digital signal processor. They are called output integrated chips, rather than input integrated chips because they represent the chips in the output video signal as opposed to those in the original input. The digital signal processor actually decodes the data represented by the output integrated chips and verifies that the data has been properly placed on the video signal. (This final check is not shown in the flow chart to be described below, but the decoding process is the same as the decoding process performed by any receiver, as will be described below.)

The digital signal processor 16 is under the master control of microprocessor 38, which in turn communicates with memory 40 and a serial input/output line 42. The details of the microprocessor operation are not important for an understanding of the present invention. The microprocessor determines the text to be added to the video signal based upon text that is already present in the input video signal (if any), with there being two-way communication between digital signal processor 16 and microprocessor 38.

If the data has been encoded improperly on the video signal, that is determined in the final check by operating on the output integrated chips. It is too late to take everything back—the video has already been sent. All that is done is to encode the next field with a message that in effect says to each receiver that the data in the previous field should be ignored. The data is then re-encoded in the current field.

There are many other cases where it may be advantageous to add text or data to the text or data already on the incoming video. A local franchisee of McDonald's, for example, may add a Coke to the Big Mac that McDonald's is offering, or verification may be added to a coupon. All of this is done at a higher level by the microprocessor and is of no concern to the invention. The invention pertains to how the data is encoded and decoded, not to what the data represents. Similar remarks apply to error correction protocols, for example, which may advantageously be employed but do not comprise a part of the present invention.

FIGS. 4A and 4B comprise a flow chart of the encoding process. The synchronization pattern that begins on one of the first viewable horizontal lines is added to the video in a manner similar to how other chip patterns are added, as will be described in detail. The insertion of the sync pattern is not shown in the flow chart so as not to complicate the drawing. The pattern consists of a special PN sequence that covers eight lines, as described above.

In step 11, the next input video field is decoded. The decoding is the same process to be described below in connection with what takes place in a receiver. As mentioned above, the input video signal must be decoded just in case there is already data on it. If there is, the data for the entire field is rewritten because, when adding data, it may be necessary to reconstruct the entire field, rather than simply to add chips in positions corresponding to data that was originally "stuffed" into the field, or to add data in positions that had no data. The integrated chip values are calculated as shown in FIG. 7, and in step 25 they are stored by the signal processor. In step 13, a check is made to see whether there is any data on the input video. If there is, then in step 15 the data is decompressed, if it was originally compressed, and errors are corrected, if the original data was transmitted with error correction. As mentioned above, error correction and compression occur at a higher level than the steps involved in the method of the invention, and do not form a part of the invention per se.

In step 17, a check is made to see whether there is room for new data (i.e., are any lines devoid of chips, or do any lines simply represent a "stuffing" pattern which has no meaning) in the video signal. If not, a return is made to step 11, where the next input video field is operated upon. The current field is simply transmitted through onefield delay memory 14 with no change.

On the other hand, if there is room for new data as determined in step 17, that new data is added to the old, the data may be compressed, and error correction codes may be added. All of this is done by microprocessor 38. Because the integrated chip values extended to digital processor 16 represent the original chip amplitudes, the original encoding levels for each group of 8 lines may be determined in step 21. In step 23, a table is formed to represent the amplitude to be added to or subtracted from the video for each of the chips in the 8 lines representing the symbol.

In step 21, the original encoding level is determined for all of the chips in each group of 8 lines that represent a four-bit symbol. Individual chips may have different magnitudes, but it is not feasible to determine what they were at the time of the original encoding. The best that can be done is to estimate an original encoding level for a group of chips, and all of those chips corresponding to a particular symbol are used to estimate an average encoding level for the 16 chips corresponding to the symbol. That is why in step 21 the original encoding level is estimated for the group of eight lines corresponding to each symbol. Not all of the integrated chip values are used in this process. In step 11, when the input video field is first decoded, integrated chip values that are too large are ignored. (This will become clear when the decoding process is considered by itself in detail.) Thus, not all integrated chip values are even available for estimating the original encoding level in step 21. The same value is placed in the chip amplitude table for all chips representing each symbol. That value is only an estimate because the individual integrated chip values themselves may not accurately reflect the difference between chip amplitudes if the video changed appreciably from line to line. Nevertheless, an initial estimate is made of the original encoding level. This level will be used, after modification as will be described, to strip out each of the original chips in the eight lines being processed. It should be appreciated that the chip amplitude table is set in accordance with the symbols which are determined in step 11. These are the symbols that have the highest correlation values during the decoding process, so that the 16 chips corresponding to each symbol in the field are known. The term "reversing pattern" in step 23 refers to the fact that the chip amplitudes that are stored are used to reverse the chips that are in the video signal, that is, to eliminate them.

If it is determined in step 13 that there is no data on the input video, then microprocessor 38 builds data for a new field. This is shown taking place in step 27.

Because there are no chips in the input signal, there is nothing to strip out. Thus, in step 29, 0s are initially stored for every chip in the chip amplitude table.

When the processing enters step 31, the chip amplitude table consists of either all 0s, or "reversing" values which ideally strip out the original chips from the video signal. Thus, in step 31 the system can begin to add chip amplitudes for the new data as if there are no chips to begin with. The microprocessor determines the data to be encoded, and thus the PN sequences. The digital signal processor adds the lowest possible chip amplitudes for the new data to the chip amplitude table. Any integrated chip value is a function of the chip length, the integrator gain and the chip amplitude. The system knows the chip length and the integrator gain of any receiver, and thus the lowest chip amplitude for each new chip is known for use in step 31.

At this point, the chip amplitude table contains a value for a chip that is to be added at each position in the video field. Each value is the sum of a voltage estimate that is designed to eliminate the original chip in the incoming video, and a voltage that will add the new chip so that it can be decoded accurately. A test is now performed, entirely in the digital domain, to see whether the outgoing video will decode properly at a receiver. Each integrated chip value stored in step 25 is added to the integrated chip value component that will be introduced by any chip pair in the chip amplitude table. The sums calculated in step 33 represent the integrated chip values that will be computed at any receiver. (The input integrated chip values are not actually added to the chip amplitude table because this table represents chip amplitudes to be added to the video signal, and the values should not be changed during the test. An auxiliary table can be used for the test.)

In step 35, a simulated video signal is decoded. The signal is simulated because samples of an actual analog signal are not taken. Instead, the integrated chip values derived in step 33 are used. The usual decoding process is performed in step 35, the decoding process to be described in detail below but reflecting the algorithm depicted in FIGS. 7 and 8. In step 37, a check is made to see whether all of the symbols have been decoded correctly. (It goes without saying that many chips will give rise to integrated chip values that do not correspond to chips in the PN sequences that are being transmitted. The most that can be hoped for is that the statistical test will produce the correct symbol "winners" for the field.) The test is whether all symbol data bits represented in the field are correct. If any symbols are decoded incorrectly, the corresponding chips in the associated PN sequences have their amplitudes increased by a fixed amount (e.g., 20% of the maximum peak-to-peak amplitude) in the chip amplitude table in step 39. (A similar technique of increasing the chip amplitudes, while not described in the above-identified Broughton et al. patent, was in fact implemented in the commercial use of the Broughton et al. invention.) If any chip amplitude exceeds the maximum allowable chip amplitude, as determined in step 41, then no data is stored in the field being processed, and a return is made to step 11. On the other hand, if no chip amplitude is above the maximum, the chip amplitude table is updated in step 43, and the process repeats with the input integrated video chip values being added to the chip amplitude table in a simulated encoding and then decoding process.

Finally, if all of the bits decode correctly, as the field leaves field delay memory 14, in step 45 the chips are added in adder 22, as required. The system then returns to step 11 to decode the next input video field.

If in step 41 it is determined that it is not possible to increase the amplitude of the chips in the wrong PN sequences without exceeding the maximum level, then instead of transmitting no data on the field, it is possible to transmit the video with the data at the input of analog-to-digital converter 10. (The converter can be 8-bit, 10-bit, 12-bit or any other suitable value.) While it may be that recomposing the field of data may not be feasible, there is no reason not to allow the field to be broadcast with its original data.

The decoder is shown in FIG. 5. The input video is applied to a 10-bit analog-to-digital converter 50. Video sync separator 56 extracts the horizontal sync pulses from the video and applies them to a trigger input of digital integrator 52. In this way, the digital integrator can form an integral over each chip, and calculate the integrated chip values as shown on FIG. 7. These values are delivered to microprocessor 54, which is also furnished synchronization information from the video sync separator. The microprocessor determines which symbols correspond to the received PN sequences. It will be recalled that a decode process is performed preferably in hardware during the encoding, at the output end of the encoder shown in FIG. 3, as discussed above. The encoder must perform much more processing, and its microprocessor has more power than that of each decoder. Therefore, it is possible to perform the decoding in step 11 of the overall encoding process in software rather than hardware. No matter how it is done, however, the logic for the decode process is the same in both cases, and hardware or software can be employed in either case.

FIGS. 6A and 6B are a flow chart of the decoding process. The generation of integrated chip values has already been described in connection with FIG. 7, and FIG. 8 shows the correlation process using the results of FIG. 7. The flow chart illustrates exactly how and when the integrated chip values are derived, and the manner in which the correlation process takes place.

In steps 51 and 53, the system looks for vertical and horizontal sync. When the first horizontal sync of a new field is detected, a determination is made whether it is time to check for the sync PN sequence. In step 55, the system starts to look for the sync sequence on line 23, even though the sequence is encoded on line 25 in the field. As described above, the reason for this is that post-encoder processing may cause the first line to be moved one or two lines up or down. For this reason, the decoder must start looking for the sync PN sequence a little early and continue looking for it a little late.

After 12 lines of data have had their chips integrated, the sync PN sequence has been transmitted on 8 of those lines. The sync PN sequence is correlated with the 16 integrated chip values derived from the first 8 lines. The result is stored in step 57, and in step 59 a check is made whether the last line (line 34) which might possibly have sync chips in it has been processed. If not, a return is made to step 53. The sync PN sequence is first correlated with the integrated chip values derived from lines 23–30. The next time around the correlation is with the integrated chip values derived from lines 24–31. This process continues, with the last correlation being of the sync PN sequence with the 16 integrated chip values in lines 27–34. (As mentioned above, the sync PN sequence can be one of the PN sequences used to represent the four-bit symbols, or it can be a completely different sequence.)

In step 61, the highest sync correlation result is determined. This locates the first line of chips that represent data. The first data PN code starts immediately after the sync sequence. (The highest sync correlation result must be greater than the second highest by at least 100% or else the overall test is ignored and the system waits for a new field.)

In step 63, eight lines for the next data PN code are integrated and saved, and the integrated chip values are then calculated. An integrated chip value can be derived by integrating the video signal over the course of a chip and then subtracting one value from the other, or the subtraction can be performed before the integration. The system, in step 83, then selects the first one of the 8 possible PN sequences that is to be correlated with the received data code.

A check is made to see whether any integrated chip value is too large. The threshold used in the test is unique to every system. The first integrated chip value for the new PN code is accessed in step 65, and the value check is made in step 67. For example, if the value is larger than 1.5 (or 2.0, in another example) times the highest value it would integrate to with perfect video i.e., the same video for both chips in a pair, then the integrated chip value must have been affected excessively by the video signal. For example, if the maximum amplitude that can be added to the video signal is 30 millivolts, then the integrated chip value for the two chips should be (30 millivolts)(2)(width of the chip in milliseconds)(integrator gain). Note that in this formula the video is not included because with perfect video (meaning that the video during the course of the two chips is the same), the video cancels out. Also, the factor (2) is in the calculation because the chip amplitude of minus 30 millivolts is subtracted. (Alternatively, if the first chip is negative, then the final result is twice the magnitude, but negative.) Any integrated chip value will be too large if the horizontal lines in a pair are not similar over the duration of the chips in the pair. If the value is not too large, then in step 69 it is included in the correlation accumulator for the PN sequence under test. Referring to FIG. 8, the correlation accumulator for each of the 8 possible PN sequences (16, without inverse codes ever being sent first) is simply a summer. Each integrated chip value is added to or subtracted from the sum, depending on the value of the corresponding chip in the PN sequence. Each accumulator can have a positive or a negative value.

In step 71, a test is performed to determine whether the previous integrated chip value was too large. If it was not, a branch is taken to step 85, the purpose of which will be described below. But if the previous integrated chip value was too large, then no further processing on the current integrated chip value is performed, and a branch is made directly to step 73. Here it is determined whether all chips for the PN sequence under test have been processed. If not, a return is made to step 65 to get the next integrated chip value. In step 75, which is performed only after all 16 integrated chip values have been processed for the PN sequence under test, it is determined whether all 16 PN sequences have been compared with the 16 integrated chip values being processed. If not, the next PN sequence is selected in step 79 and a return is made to step 65 for processing of the first integrated chip value, this time using the newly selected PN sequence.

Finally, in step 77 the PN sequence with the highest correlation accumulator magnitude is selected as the "winner." As described above, positive and negative values correspond to different ones of the 16 PN sequences. In step 81, a check is made whether all data have been processed for this field. If yes, a return is made to step 51. If no, a return is made to step 63 so that the next data sequence can be processed.

The problem is what to do with an integrated chip value that is determined in step 67 to be too large. Also, it has not yet been described what additional processing is performed when the current integrated chip value is determined not to be too large in step 67, and the same is true of the previous integrated chip value as determined in step 71. The latter sequencing will be described first, and the first integrated chip value for which there is a previous one is the second.

In the first iteration for each PN sequence, when processing the first integrated chip value, there is no previous value, and the answer to the test of step 71 is set to yes. If the second integrated chip value is not too large, as determined in step 67, once again in step 69 the value is included in the correlation accumulator for the PN sequence that is being operated upon. Now when step 71 is executed, there is a previous integrated chip value. If it was not too large, a test is performed in step 85 to see whether the present and previous chip values match the PN sequence under test. The chart next to step 85 indicates that if the PN sequence under test has a 00 or a 11 for the two chip positions under consideration, and if the two integrated chip values have the same sign, then a branch is taken to step 89. It must be recalled that because a PN sequence can be first transmitted in either its normal form or its inverse form, followed by either the inverse form or the normal form, an integrated chip value of either sign may increase the correlation value for the particular PN sequence under test (since the final "winner" is the correlation value having the largest absolute magnitude, even if it is negative). Thus, as long as there is a "match" in step 85, it is an indication that there are two successive integrated chip values that correspond with the PN sequence under test. Because there are two "hits" in a row, it is more likely that the incoming PN code being processed corresponds to the PN sequence under test. For this reason, not only is the integrated chip value included in (added to or subtracted from) the correlation accumulator in step 69, but it will also be included a second time as a result of the match determined in step 85.

Furthermore, if the previous integrated chip value is different from the present one, then it is even more likely that the integrated chip values are correct than if the previous and present values are of the same sign. This is due to the fact that it is most likely that there is no video bias from line to line affecting the integrated chip value's sign if adjacent chips not only match the PN sequence under test but also are different in polarity. For this reason, a test is performed in step 89 to see if the sign of the previous chip is the same or different from the sign of the present chip. The net result is that if one of two successive integrated chip values has a polarity which does not match the corresponding chip in the PN sequence under test (determined in step 85), then a branch is taken to step 73 with the current integrated chip value having been added to the correlation accumulator only once in step 69. If the present integrated chip value and the previous one both match the corresponding chips in the PN sequence under test (determined in step 85), and it is determined in step 89 that they have the same sign, then in step 87 the present integrated chip value is added to or subtracted from the correlation accumulator one more time, corresponding to the fact that in step 85 it was determined that there is a sequence of at least two integrated chip values that matches the PN sequence under consideration. Finally, if in step 89 it is determined that the current integrated chip value has a different sign from the previous one, then in step 91 the current integrated chip value is included two more times in the correlation accumulator.

Steps 81, 93, 95 and 97 have not yet been discussed, and an understanding of these steps requires a consideration of FIGS. 9A, 9B and 10. The test in step 67 is whether the integrated chip value being processed is too large. If it is, it means that there was a change in the video from line to line such that the difference between the integrals for the durations of the two chips in the respective pair exceeds the maximum difference between two opposite polarity chips so that the integrated chip value is too highly dependent on the video. If for the PN sequence being tested against the incoming data sequence the previous chip is the same polarity as the current chip, then there is nothing that can be done with the integrated chip value and a branch is taken to step 73. For all intents and purposes, the integrated chip value being processed is ignored and not added to or subtracted from the correlation accumulator for the PN sequence under test. This simply means that the PN sequence under test is less likely to be the "winner." But if the previous chip for the PN sequence under test has a different polarity from the current one, then in step 93 the previous integrated chip value is subtracted from the present one. If the difference is too large (the meaning of this will be discussed in connection with FIG. 10), then once again there is no way in which the current integrated chip value can be used and a branch is taken to step 73. But if the difference is not too large, then in step 97 the difference is included in the correlation accumulator before moving on to step 73. The reason that this technique works will be apparent from a consideration of FIGS. 9A, 9B and 10.

Referring to FIG. 9A, two successive video lines are depicted with inverse chip patterns. The most important point to observe is that in the first case the video is shown as having a value of 0.5 volts, and in the second it is shown having a value of 0.2 volts. With a maximum peak chip amplitude of 0.1 volts, it is apparent that the difference between the two video biases is three times greater than the peak-to-peak amplitude of a chip. The third line of FIG. 9A assumes an integrator gain of 1, and for this case, taking into account the video biases, it is seen that two of the integrated chip values are 0.4 and two of them are 0.2. All four of these values are too large and they clearly reflect the different video biases.

FIG. 9B shows why the video bias between lines causes an error in decoding the signal. Looking at the first line of FIG. 9A, it is apparent that the chip sequence that is being transmitted is 1001. FIG. 9B shows the processing when the incoming PN code is compared against the correct PN sequence 1001 and the incorrect sequence 1110. Using the usual rules, a 1 in a PN sequence being compared against the incoming code causes the integrated chip value to be added to the accumulator, and a 0 causes it to be subtracted from the accumulator. In the case of the correct PN sequence 1001, the four successive integrated chip values of 0.4, 0.2, 0.2 and 0.4 are respectively added to, subtracted from, subtracted from, and added to the correlation accumulator, giving rise to a final value of 0.4.

In the case of the incorrect PN sequence 1110, the four integrated chip values are added to, added to, added to, and subtracted from the accumulator. This gives a final result of 0.4, the same as that for the correct PN sequence. Consequently, the bias between the lines clearly causes an error because the effect of the four integrated chip values is the same on the correlation accumulator for both the correct PN sequence and an incorrect PN sequence.

FIG. 10 specifies the two rules for implementing steps 93, 95 and 97 if the present integrated chip value being processed has a polarity different from the previous integrated chip value. Rule 1 is that if the present integrated chip value corresponds to a chip amplitude that is greater in magnitude than 1.5 times the maximum peak-to-peak chip amplitude, then it is not used except as described in Rule 2. This Rule basically represents the subsequent processing in steps 93, 95 and 97, and the chart at the bottom of FIG. 10 illustrates application of the Rule to the same two PN sequences 1001 (the correct one) and 1110.

The usual add or subtract rule applies, with a PN chip of 1 meaning that the integrated chip value should be added to the correlation accumulator and a PN chip of 0 indicating that the integrated chip value should be subtracted from the correlation accumulator. The "last different" column shows whether the chip under consideration is the same as or different from the previous one. The symbol NA (not applicable) refers to the fact that the first chip in each sequence has no previous chip, so it is neither the same nor different. The "out-of-range" column simply means that the test in step 95 indicates that the integrated chip value is too large. Referring to FIG. 9A, the example under consideration, all four integrated chip values are either 0.2 or 0.4, and all exceed the peak-to-peak chip amplitude of 0.1 volts by more than 1.5 times. The last column shows how the correlation accumulator is affected by the two Rules.

For the first PN sequence 1001, the first integrated chip value is ignored because the first chip is not different from the previous chip in the PN sequence (since there is no previous chip). The correlation accumulator remains at 0. The next chip is different from the preceding one, so the rule is that in step 93 the previous integrated chip value is subtracted from the current integrated chip value, and then the difference is subtracted (because the second chip in the PN sequence under test is a 0) from the correlation accumulator. The previous integrated chip value from FIG. 9A is 0.4 and the present integrated chip value is 0.2, and thus the difference is 0.2. When this value is subtracted from the correlation accumulator, the correlation accumulator exhibits a value of +0.2. The third integrated chip value is ignored because the chip in the PN sequence under consideration has the same value as the previous one. Finally, the fourth chip is different from the third, so in the last step of the processing for this example, the third integrated chip value is subtracted from the fourth, and the difference is added to the correlation accumulator. The last integrated chip value is 0.4 and the third is 0.2, so the difference is 0.2, which is added to the accumulator to give a final result of +0.4.

For the incorrect PN sequence 1110, it is apparent that the first three integrated chip values are ignored because in none of these cases is the previous chip different from the present. But because the fourth chip in the PN sequence is a 0 and the third is a 1, the third integrated chip value is subtracted from the fourth, and the difference is subtracted from the correlation accumulator. This gives a correlation accumulator result of −0.2.

When comparing the two results, and recalling that the "winner" is the one with the largest absolute magnitude, it is apparent that the processing did allow at least some of the integrated chip values that were too large to be processed and to affect the correlation accumulators.

It should be noted that in step 95 a test is made to see whether the difference is too large. In all cases considered in the example of FIG. 10, where the previous integrated chip value is subtracted from the present one, and the present one was either added to or subtracted from the correlation accumulator, the difference was either +0.2 or −0.2. The absolute magnitude of such a difference is more than 1.5 times the peak-to-peak chip amplitude, the test in step 67. However, the test in step 95 is whether the difference is three times the peak-to-peak chip amplitude. The reason for this is that the subtraction operation of step 93, the purpose of which is to get rid of the video bias, in effect doubles the integrated chip value information. If for the PN sequence under test the previous chip and the present chip have different signs, then the two successive integrated chip values should have opposite signs. When one is subtracted from the other in order to get rid of the video bias, this has the effect of doubling the contribution of the chips themselves. That is why the threshold for the test of step 95 is twice that for the test of step 67. If in any case the difference determined in step 93 is greater than three times the peak-to-peak chip amplitude, then a branch is taken to step 73 and the integrated chip value being processed is ignored.

Referring back to FIG. 9A, it can be seen why this additional processing allows integrated chip values that are too large to nonetheless contribute to the correlation accumulators. Where there should be a transition in chip polarity (determined in step 81), the integrated chip value before the transition and the integrated chip value after the transition will both have a large factor due to the fact that the video bias in one line is so much greater than the video bias in the other. However, when one integrated chip value is subtracted from the other, the video bias difference drops out. Because the chip values are different, what remains is really an absolute magnitude that is equal to the sum of two absolute magnitudes since the contributions of the chips to the integrated chip values have different signs, and one is subtracted from the other. There is no guarantee that the technique works because the system has no way of knowing that, in fact, the two successive incoming chips have different values, i.e., the system has no way of knowing that there is a transition between the two chips. The test in step 81 simply relates to the PN sequence under test—does it have two successive chips of opposite values? The ultimate test is whether the difference is too large in step 95. If it is, it means that there is just no way that the integrated chip value can be used. If it is not too large, however, it is assumed that the difference in integrated chip values does correctly reflect the value of the current chip so the difference is included in the correlation accumulator for the PN sequence under test.

It is because the processing shown in FIGS. 9A, 9B and 10 takes place only if in step 81 it is determined that the present PN sequence under test has a transition between the chip positions being processed that it is desirable that the PN sequences used to represent the symbols that can be transmitted have a large number of transitions. Preferably, for 8-chip PN sequences, each of the PN sequences should have at least five transitions, and no more than five 0s or 1s in a row.

For the ease of explanation, the invention has been described in terms of each PN sequence having eight lines of four chips each, with the lines being paired (normal and inverse) so that each PN sequence actually contains 16 different items of information. In actual practice, it is preferred that each line have 20 chips. This is shown in FIG. 11. In general, the number of lines per PN sequence, the number of chips per line, the chip amplitude, the chip starting point, and the number of PN sequences possible for a symbol of any size can all be varied. Increasing the number of chips per line improves the error rate. However, as the chips become smaller, line synchronization becomes more important and it is more difficult to decode the video signal for this reason.

The preferred parameters are set forth in FIG. 11. The first chip starts about eight microseconds following the rising edge of the horizontal sync pulse. The chip width is 2.3 microseconds, and the peak-to-peak chip amplitude varies between 5 and 20 millivolts. The starting horizontal line is line 25 and the ending horizontal line is 233. As in the illustrative embodiment of the invention described above, there are eight lines for each data symbol, eight data patterns (PN sequences) are used for the 16 symbols, and 25 data patterns are encoded on each video field. Since in the illustrative embodiment of the invention each symbol represents 4 bits and there are 25 data patterns encoded on each video field, the raw data rate is 100 bits per field (6,000 bits per second for a 60-field per second field rate).

It should be understood that there are many other forms in which the invention can be implemented. For example, instead of synchronizing the decoding to the rising edge of the horizontal sync pulse on each line, the processing could be synchronized to the color burst signal or some other characteristic. The video signal with the superimposed data can be detected optically, as in the above-identified Broughton et al. patent, or it can be detected electrically by operating on the video signal directly. There is nothing unique about using eight PN sequences to represent 16 four-bit symbols, or eight lines per symbol. For example, 16 PN sequences can be used instead of 8. If these 16 sequences can be transmitted in either normal or inverse form first, then they can represent 32 symbols. If 10 lines are used rather than 8, and the PN sequences are made longer (assuming that the chip width remains the same), then 5 bits would be represented in 10 lines rather than 4 bits in 8, and the data rate would remain the same. In general, however, the greater the number of possible PN sequences, the greater the probability of incorrectly decoding the incoming sequence, and the greater the processing time required to determine the correct sequence.

In the illustrative embodiment of the invention, once the incoming PN code is determined, it is tested against each of the possible PN sequences one by one. Rather than to perform each PN sequence test individually, custom hardware can be employed to process all of them in parallel. In the illustrative embodiment, the analog-to-digital converters are 10-bit devices. It is possible to use 8-bit converters, although this would increase the probability of error since the encoded signal is quite small.

While in the illustrative embodiment of the invention consecutive lines for each PN sequence are paired, it is possible to interleave the PN sequences differently. It is necessary that each PN sequence be sent in its normal and inverse forms because integrated chip values must be derived; two oppositely encoded lines must be subtracted from each other in order to get rid of the video in the hope that what remains reflects just the data signal. It may even be preferable to separate lines of a pair by a few lines because the error rate may improve if it is unlikely that "bad" portions of the video will cover a number of lines in succession. In other words, if a portion of the PN sequence is corrupted, it is better that both lines of a pair not be corrupted. However, the paired lines should not be separated too much because it is desired to keep the average luminance unchanged, and the subtraction process works best if the video signals on the two lines of the pair are similar (which they are more likely to be if the lines are adjacent). As used in the claims, "paired" lines should be within about 5 of each other. The consecutive line method is preferred, however, because it is the simplest and requires the least computer memory to implement.

Instead of modulating the luminance portion of the video signal, it is possible to modulate the chrominance. In fact, it is possible to modulate both and thus double the data rate, especially since the chrominance and luminance signals do not interfere too much with each other. It may also be that the chrominance signal may be able to be modulated at a higher amplitude and therefore at a higher data rate with the same error probability as the luminance signal. In general, however, more complicated equipment is required to modulate and demodulate a chrominance signal.

It is preferred that all encoding be on a per-field basis, that is, PN sequences do not bridge successive fields. The reason for this is that video signals may be edited, for example, when going from a TV show to a commercial, and data could be cut in the middle if PN sequences are not wholly contained in a single field.

Although the invention has been described with reference to particular embodiments, it is to be understood that these embodiments are merely illustrative of the application of the principles of the invention. Numerous modifications may be made therein and other arrangements may be devised without departing from the spirit and scope of the invention.

What we claim is:

1. A method of transmitting data including a plurality of data symbols on a video channel on which video signals are transmitted, said video signals being composed of sequential visible video lines, said method comprising the steps of:
    assigning a plurality of chips to each symbol;
    generating line pairs for each symbol, each line pair corresponding to a set of chips selected from said plurality of chips, each line pair including a first line having a first polarity and a second line with a plurality opposite said first plurality; and
    combining each line pair with a two sequential video lines to generate combined video signals.

2. The method of claim 1 further comprising defining a chip table and using said chip table to include opposite polarity chips in paired lines.

3. The method of claim 2 wherein in said chip table defines chips of different magnitudes.

4. The method of claim 1 further comprising the step of:
    decoding said combined video signal by separating said chips from said visible video lines.

5. The method of claim 4 wherein the decoding includes deriving the difference of the integrals of the video signal operated upon over the course of each pair of opposite polarity chips, and statistically correlating each of said chip patterns with the integral differences to determine the highest correlation.

6. The method of claim 5 further providing a chip amplitude table to derive said chip pattern wherein said chip amplitude table includes opposite polarity chips in paired lines in said combined video signal.

7. A method of encoding data in the visible portion of a transmitted video signal without degrading display of the received video signal and for decoding said data in the received video signal, comprising the steps of:
    (a) selecting for a group of data bits to be transmitted an associated one of a number of longer predetermined sequences of chips,
    (b) dividing the selected sequence of chips into a multiplicity of lines of chips,
    (c) embedding each line of chips and its inverse, in pairwise fashion, in respective pairs of line scans of said video signal prior to its transmission, and
    (d) selecting a chip sequence which corresponds to the imbedded chips.

8. A method in accordance with claim 7 wherein in step (c) the two possible values of a chip cause changes in a characteristic of the video signal in respective opposite directions.

9. A method in accordance with claim 8 wherein one line scan in each pair of line scans operated upon is subtracted from the other line scan in the same pair in order to reduce the effect of the video signal on, and to increase the amplitude of, the detected line of chips.

10. A method in accordance with claim 8 wherein each line scan is operated upon by deriving an integration function for each chip, and each chip function for one line scan is subtracted from a chip function for a correspondingly positioned chip in the paired line scan.

11. A method in accordance with claim 10 further including the steps of embedding a synchronizing chip pattern in a number of line scans of said video signal prior to its transmission, and operating on the received video signal to determine the position of the synchronizing chip pattern in order to ascertain chip positions for the detecting step .

12. A method in accordance with claim 8 wherein in step (d) one line scan in each pair of line scans operated upon is subtracted from the other line scan in the same pair in order to reduce the effect of the video signal on, and to increase the amplitude of, the detected line of chips.

13. A method in accordance with claim 8 wherein each line scan is operated upon by deriving an integration function for each chip, and each chip function for one line scan is subtracted from a chip function for a correspondingly positioned chip in the paired line scan.

14. A method in accordance with claim 8 further including the steps of embedding a synchronizing chip pattern in a number of line scans of said video signal prior to its transmission, and operating on the received video signal to determine the position of the synchronizing chip pattern in order to ascertain chip positions for the detecting step.

\* \* \* \* \*